US012356197B2

(12) United States Patent
Sniegocki et al.

(10) Patent No.: US 12,356,197 B2
(45) Date of Patent: Jul. 8, 2025

(54) TRACTOR TRAILER PAIRING CONFIRMATION SYSTEM AND METHOD

(71) Applicant: Truck-Lite Co., LLC, Falconer, NY (US)

(72) Inventors: Paul Sniegocki, Pittsburgh, PA (US); Eugene Novak, Pittsburgh, PA (US); Michael Violi, Pittsburgh, PA (US)

(73) Assignee: Truck-Lite Co., LLC, Falconer, NY (US)

(*) Notice: Subject to any disclaimer, the term of this patent is extended or adjusted under 35 U.S.C. 154(b) by 320 days.

(21) Appl. No.: 17/940,752

(22) Filed: Sep. 8, 2022

(65) Prior Publication Data

US 2023/0073417 A1   Mar. 9, 2023

Related U.S. Application Data

(60) Provisional application No. 63/241,648, filed on Sep. 8, 2021.

(51) Int. Cl.
*H04W 12/50* (2021.01)
*H04W 4/40* (2018.01)
*H04W 4/80* (2018.01)

(52) U.S. Cl.
CPC ............. *H04W 12/50* (2021.01); *H04W 4/40* (2018.02); *H04W 4/80* (2018.02)

(58) Field of Classification Search
CPC ................................ H04W 12/50; H04W 4/80
See application file for complete search history.

(56) References Cited

U.S. PATENT DOCUMENTS

| | | | |
|---|---|---|---|
| 8,989,053 B1* | 3/2015 | Skaaksrud | H04W 4/80 370/255 |
| 9,738,125 B1* | 8/2017 | Brickley | H04W 4/70 |
| 2013/0144474 A1* | 6/2013 | Ricci | G06F 21/42 701/22 |
| 2019/0208552 A1* | 7/2019 | Dieckmann | H04W 76/10 |
| 2020/0296779 A1* | 9/2020 | Moghe | H04B 3/544 |
| 2021/0042705 A1* | 2/2021 | Suen | G06Q 10/0838 |
| 2021/0409925 A1* | 12/2021 | Suda | H04W 4/80 |
| 2022/0245971 A1* | 8/2022 | Howard | G07C 5/008 |

* cited by examiner

*Primary Examiner* — David Bilodeau

(74) *Attorney, Agent, or Firm* — REISING ETHINGTON, P.C.

(57) ABSTRACT

A system for confirming pairing of a tractor and a trailer includes the trailer having: a controller, capable of short-range wireless communications; and an electronic control unit (ECU), configured to generate and transmit an anti-lock braking system (ABS) check signal including a unique trailer identifier to the tractor, such that a short-range wireless connection between the controller and the tractor is established using the unique trailer identifier transmitted with the ABS check signal.

17 Claims, 2 Drawing Sheets

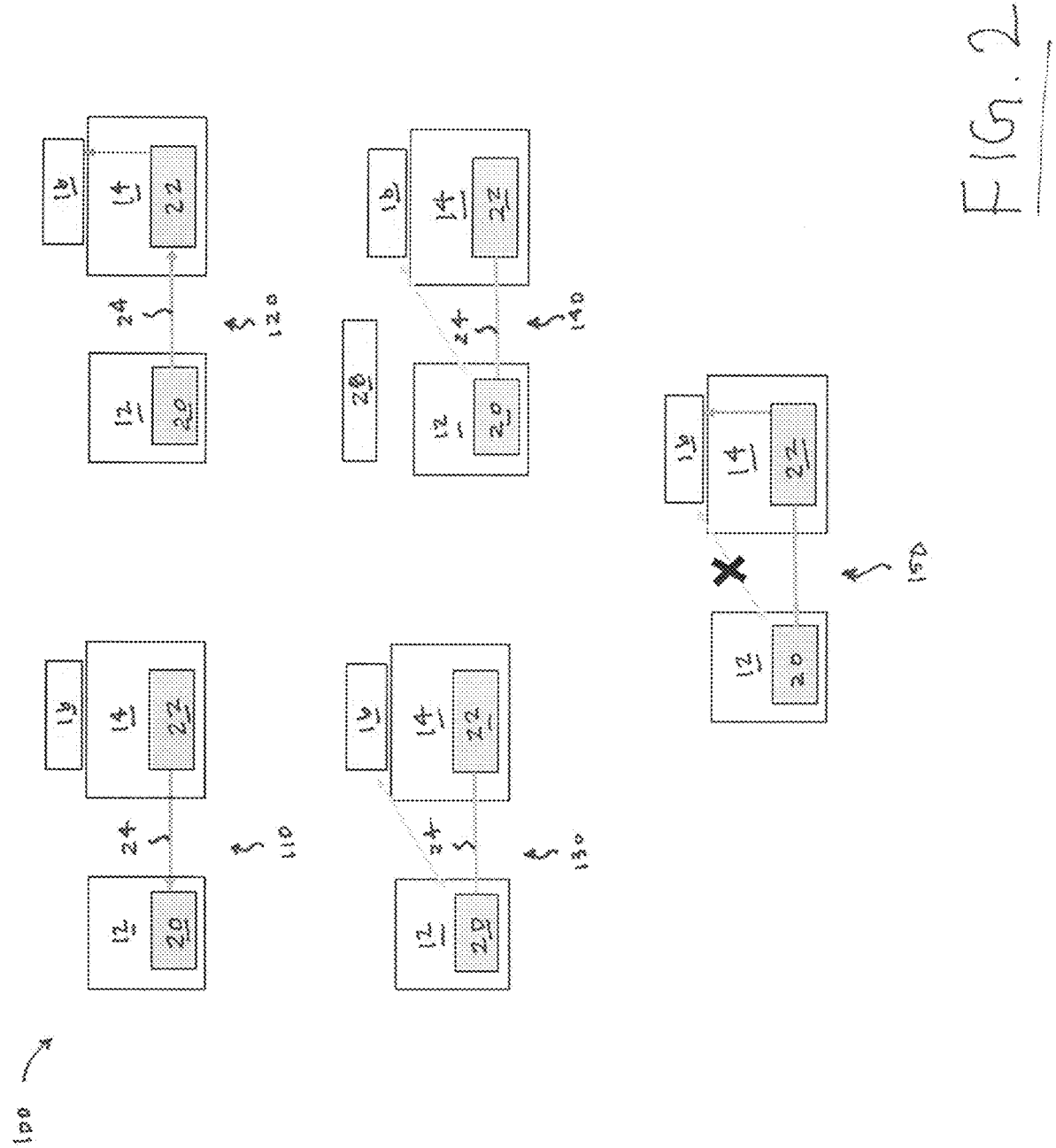

TRACTOR TRAILER PAIRING CONFIRMATION SYSTEM AND METHOD

CLAIM OF PRIORITY

This application claims priority to U.S. Provisional Application No. 63/241,648 filed Sep. 8, 2021 the entire content of which is incorporated in its entirety.

FIELD OF INVENTION

The present invention relates to a system and method for providing confirmation of correct pairing between a tractor and trailer.

The trucking industry relies on tractors to haul trailers loaded with cargo across great distances. In general, the number of trailers is much greater than the number of tractors. Commonly, trailers are docked at trailer yards while they wait for tractors to connect to them. Owners of trailer fleets coordinate with owners of tractor fleets to determine a schedule of which tractor will connect with which trailer and in what order/timeline to haul the trailer cargo to its intended destination.

Various issues arise within the execution of a trucking schedule between the tractors and trailers. For example, in some instances tractors fail to engage and pick up the intended/scheduled trailer and instead mistakenly connect to the wrong trailer. This can result in lost time and money from moving cargo to an unintended location and delays in moving the intended trailer cargo.

One reason why this issue persists is that there is no current solution for confirming that the physical pairing between a tractor and trailer matches the intended pairing in the trucking schedule.

Accordingly, an improved system and method for confirming the pairing between a tractor and trailer is needed.

BRIEF DESCRIPTION OF THE DRAWINGS

FIG. 2 depicts an implementation of a system for accurately pairing tractors with trailers.

SUMMARY OF THE DISCLOSURE

Figure 1:
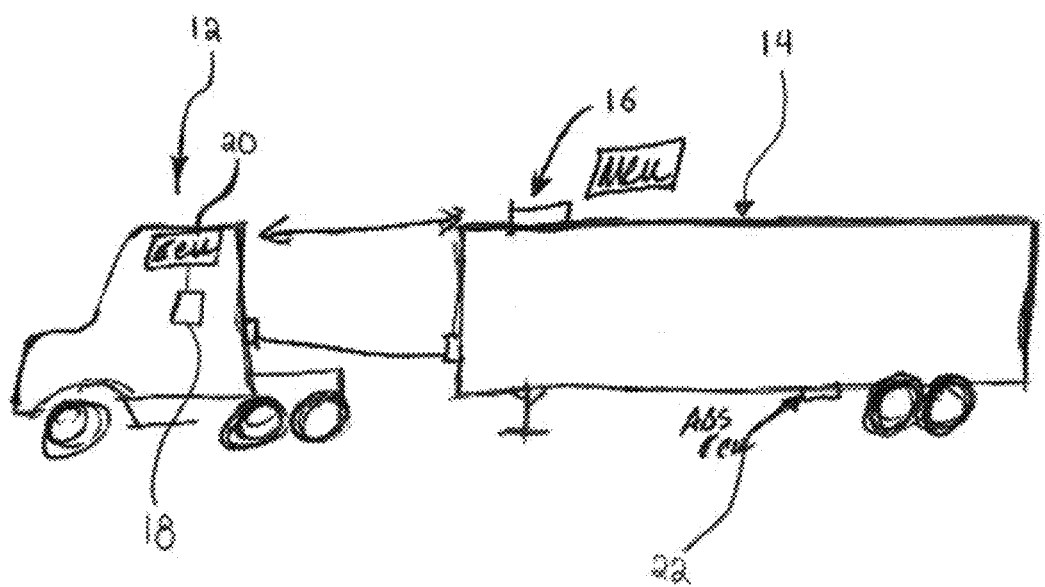
FIG. 1 depicts an implementation of a tractor connected to a trailer.

In one implementation, a system for confirming pairing of a tractor and a trailer includes the trailer having: a controller, capable of short-range wireless communications; and an electronic control unit (ECU), configured to generate and transmit an anti-lock braking system (ABS) check signal including a unique trailer identifier to the tractor, such that a short-range wireless connection between the controller and the tractor is established using the unique trailer identifier transmitted with the ABS check signal.

In another implementation, a method of confirming pairing of a tractor and trailer includes connecting a trailer to a tractor via a physical data cable; communicating a unique trailer identifier between the trailer and the tractor via the physical data cable; establishing a short-range wireless connection between the trailer and the tractor; transmitting the unique trailer identifier from the trailer to the tractor via the short-range wireless connection; and determining whether the unique trailer identifier communicated to the tractor via the physical data cable matches the unique trailer identifier transmitted to the tractor via the short-range wireless connection.

In yet another implementation, a system for confirming pairing of a tractor and a trailer, includes the trailer having a controller, capable of short-range wireless communication and wired communication with the tractor, such that the controller is configured to: communicate a unique trailer identifier between the trailer and the tractor via a physical data cable; establish a short-range wireless connection between the trailer and the tractor; transmit the unique trailer identifier from the trailer to the tractor via the short-range wireless connection; and determine whether the unique trailer identifier communicated to the tractor via the physical data cable matches the unique trailer identifier transmitted to the tractor via the short-range wireless connection.

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of what is disclosed here. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A portion of a tractor and trailer pairing confirmation system 10 and method are generally presented. The tractor and trailer pairing confirmation system ("system") 10 may generally comprise a tractor 12 and a trailer 14. The tractor 12 and trailer 14 may each separately include a controller, such as a master control unit ("MCU") 16 located on the trailer, and an in-cab controller 18 located on the tractor.

The MCU 16 may be configured to transmit and receive data both wirelessly and via a wired cable connection. For example, the MCU 16 may be implemented as a telematics unit enabled to allow for remote communication over a wireless carrier system and a land network, as well as using short-range wireless communication techniques, such as WiFi or Bluetooth. The MCU 16 can send and receive data between a remote back-office entity, such as a tractor fleet management office, using the wireless carrier network/land network, and can also communicate wirelessly with a nearby trailer 14 using short-range wireless techniques.

The telematics communications may allow the MCU 16 to communicate directly or indirectly (such as through a cloud storage system) with the remote back-office entity, such as the trailer fleet management office. In an embodiment, the in-cab controller 18 may have the same or similar functionality as the MCU 16, enabling the controller 18 to communicate remotely with the tractor fleet management office.

The wireless carrier system is preferably a cellular telephone system that includes a plurality of cell towers, one or more mobile switching centers (MSCs), as well as any other networking components required to connect the wireless carrier system with the land network. Each cell tower includes sending and receiving antennas and a base station, with the base stations from different cell towers being connected to the MSC either directly or via intermediary equipment such as a base station controller. The wireless carrier system can implement any suitable communications technology, including for example, analog technologies such as AMPS, or digital technologies such as CDMA (e.g., CDMA2000) and GSM/GPRS as well as 4G LTE and 5G standards set by the 3GPP wireless standard-setting organization. As will be appreciated by those skilled in the art, various cell tower/base station/MSC arrangements are possible and could be used with wireless system. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

The land network may be a conventional land-based telecommunications network that is connected to one or more landline telephones and connects the wireless carrier system to the trailer fleet management office. For example, land network may include a public switched telephone network (PSTN) such as that used to provide hardwired telephony, packet-switched data communications, and the Internet infrastructure. One or more segments of land network could be implemented through the use of a standard wired network, a fiber or other optical network, a cable network, power lines, other wireless networks such as wireless local area networks (WLANs), or networks providing broadband wireless access (BWA), or any combination thereof. Furthermore, the trailer fleet management office need not be connected via land network, but could include wireless telephony equipment so that it can communicate directly with a wireless network, such as the wireless carrier system.

The trailer fleet management office can be implemented using one or more computers accessible via a private or public network, such as the Internet. Each such computer can be used for one or more purposes, such as a web server accessible by the MCU 16 via the wireless carrier. Other such accessible computers can be, for example: a computer used by the tractor 12 or trailer 14 owner or other subscriber for such purposes as scheduling days and times at which a particular tractor 12 will be coupled to a particular trailer 14.

The MCU 16 may be configured to receive scheduling information from the fleet management office. The scheduling information may include an association between a tractor 12 and the trailer 14 within a time window to be paired. The tractor 12 and trailer 14 may each include a unique identifier that is used within the schedule information. In an embodiment, the in-cab controller 18 may also or independently receive the scheduling information.

The trailer 14 may include a trailer ECU 22 that is in communication with or integral with the trailer antilock braking system ("ABS"). The trailer ECU 22 may be configured to send an ABS check signal to the tractor 12 upon ignition of the tractor 12, or upon other conditions. The ABS check signal is commonly passed over the power line carrier ("PLC") wire that is connected to the tractor via a hardwired connection, such as a J560 pinned connector 24, that is connected between the tractor 12 and trailer 14 upon their physical engagement. It will be appreciated, however, that in some embodiments, the ABS check signal and identifier may be passed from the trailer 14 to the tractor 12 using any appropriate communication means, including but not limited to CAN bus, Ethernet, Bluetooth, WIFI, or any other appropriate communications protocol.

The ABS check signal may be received by a tractor ECU 20 that is in communication with the in-cab controller 18. The ABS check signal may include a unique identifier, such as an ABS identification or trailer identification, that is passed to the ECU 20 upon ignition of the tractor 12. The trailer identifier can also be a numeric or alpha-numeric string of characters that are unique to each particular trailer 14. The in-cab controller 18 may receive the ABS check signal, via the tractor ECU 20 or directly, and may decode the unique identifier. The in-cab controller 18 may then use the unique trailer identifier to find and wirelessly connect with the trailer MCU 16, as described in further detail below.

Specifically, the trailer MCU 16 may broadcast a short-range wireless signal or connection that requires the unique identifier in order to complete the wireless pairing with the MCU 16. Once the in-cab controller 18 has the unique identifier, it may find the wireless signal from the MCU 16 that is broadcasting that identifier and pair with that wireless signal.

Once the in-cab controller 18 is wirelessly paired with the MCU 16, such as over a Bluetooth or WIFI signal, it may allow open communication between the in-cab controller 18 and the MCU 16. The in-cab controller 18 may provide the MCU 16 with tractor identification information and the MCU 16 may cross-reference the tactor identification with the schedule information to confirm connection with the appropriate tractor 12. The MCU 16 and/or in-cab controller 18 may then send a signal, via wireless carrier network, back to the trailer fleet or tractor fleet to provide confirmation of a correct pairing between the tractor 12 and trailer 14. The tractor 12 may additionally provide visual or audible confirmation, such as a light or screen indicator, to the driver to confirm that the tractor 12 has been paired to the scheduled trailer 14.

The wireless communication between the in-cab controller 18 and MCU 16 may allow for the direct passing of gathered trailer data, such as sensed parameters on the trailer, to the in-cab controller 18 for real time display within the tractor cab. The wireless communication between the in-cab controller 18 and MCU 16 may further allow commands to be send from the tractor 12 to the trailer 14 to alter trailer settings, such as temperature settings and the like.

An implementation of a method 100 of pairing a tractor 12 and a trailer 14 using the tractor and trailer pairing confirmation system 10 is shown in FIG. 2. The method 100 begins at step 110 by connecting a tractor 12 to a trailer 14 using a physical data cable 24. In some implementations, the physical data cable 24 will solely function to communicate packetized data between the tractor 12 and the trailer 14. However, in other implementations, the physical data cable 24 can also supply electrical power from the tractor 12 to the trailer 14 or from the trailer 14 to the tractor 12. The physical data cable 24 can, in some applications, be referred to as the "Power Line Carrier", "PLC", or "Blue Line" of the trailer 14 and may be used to provide a digital or other signal from the trailer 14 to the tractor 12, such as confirmation of an ABS system check. The MCU 16, the ECU 20, or the ECU 22 could be implemented by an SSC P485 PL integrated circuit (IC) manufactured by Qualcomm or by a nRF52832 IC manufactured by Nordic Semiconductor. These ICs can communicate over the physical data cable 24, the wireless carrier system, and/or the short-range wireless link 26 between the tractor 12 and the trailer 14. Once the physical connection between the tractor 12 and the trailer 14 is made, the trailer 14 may send or permit the tractor 12 to access the unique trailer identifier. The unique identifier can be stored in and transmitted from the trailer ECU 22 over the physical data cable 24 to the tractor ECU 20. The method 100 then proceeds to step 120.

At step 120, the tractor 12 can send an acknowledgement to the trailer 14 indicating that the unique trailer identifier has been received by the tractor 12. The tractor ECU 20 can communicate the acknowledgement to the trailer ECU 22 over the physical data cable 24. In response to receiving the acknowledgement, the trailer ECU 22 can send a connection verification message to the MCU 16. In one implementation, the connection verification message can be implemented using a short-range wireless connection 26 between the tractor ECU 20 and the trailer ECU 22, such as Bluetooth LE. The method 100 proceeds to step 130.

At step 130, the MCU 16 can establish a short-range wireless connection 26 between the MCU 16 and the tractor ECU 20. The MCU 16 can broadcast or otherwise transmit the unique identifier over the short-range wireless connection 26. The tractor ECU 20 can receive the unique identifier and compare the unique identifier receive via the short-range wireless connection 26 with the unique identifier received from the trailer 14 during step 110. If the unique identifiers do not match, the method 100 ends. Otherwise, the method 100 proceeds to step 140.

At step 140, the correct pairing between tractor 12 and trailer 14 may be confirmed with the trailer fleet management office 28. For example, the fleet management office 28 can wirelessly transmit a message over the wireless carrier system that includes scheduling information. The scheduling information may include a window of time for a tractor 12 and trailer 14 to be paired, and a unique identifier for the tractor 12 as well as the unique identifier for the trailer 14. The message can be received by the tractor ECU 20 and compared with a unique identifier for the trailer 14 stored at the trailer 14. If the received unique identifier for the trailer 14 does not match what is stored at the trailer 14, then the tractor ECU 20 can send a message to the trailer 14, either wirelessly or over the physical data cable 24, indicating that the coupling between the tractor 12 and the trailer 14 is incorrect. Otherwise, if the received identifier does match the stored identifier and time window in the scheduling information, then a confirmation of the correct pairing may be communicated to the fleet management office 28. It will be appreciated that the scheduling information may be received by either the trailer ECU 22 or tractor ECU 20 and that the confirmation of the correct pairing and timing, consistent with the schedule, may be performed in either ECU 20, 22.

At step 150, the trailer 14 can monitor for the physical data cable 24 to be disconnected from the tractor 12. When the trailer ECU 22 senses that the physical data cable has been decoupled from the tractor 12, the ECU 22 can send a wireless message via the short-range wireless connection 26 indicating this event. The short-range wireless connection can then be ended. The method 100 ends.

While the method and system shown in FIG. 2 and described above include an MCU 16 on the trailer that is enabled with both short-range wireless connection 16 capabilities and a wireless carrier connection, it will be appreciated that the MCU 16 may be housed on the tractor 12 instead of the trailer 14. The operations and of the system may work substantially the same as shown and described, with the in-cab tractor ECU 20 functioning as the trailer ECU 22 and vice versa.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A system for confirming pairing of a tractor and a trailer, comprising:
    the trailer having:
        a controller, capable of short-range wireless communications; and
        an electronic control unit (ECU), configured to generate and transmit an anti-lock braking system (ABS) check signal including a unique trailer identifier to the tractor,
        wherein a short-range wireless connection between the controller and the tractor is established using the unique trailer identifier transmitted with the ABS check signal, and
        wherein the ECU references schedule information to confirm connection with the correct tractor.

2. The system recited in claim 1, wherein the ABS check signal is transmitted between the trailer and the tractor via a hardwired connection.

3. The system recited in claim 2, wherein the hardwired connection comprises a power line carrier (PLC) wire.

4. The system recited in claim 1, wherein the ABS check signal is transmitted between the trailer and the tractor via short-range wireless communications.

5. The system recited in claim 1, further comprising the tractor, including a tractor master control unit configured to wirelessly communicate with a remote back-office entity.

6. The system recited in claim 1, wherein the controller is also capable of wireless communication with a wireless carrier system.

7. A method of confirming pairing of a tractor and trailer comprises
    (a) connecting a trailer to a tractor via a physical data cable;
    (b) communicating a unique trailer identifier between the trailer and the tractor via the physical data cable;
    (c) establishing a short-range wireless connection between the trailer and the tractor;
    (d) transmitting the unique trailer identifier from the trailer to the tractor via the short-range wireless connection;
    (e) determining whether the unique trailer identifier communicated to the tractor via the physical data cable matches the unique trailer identifier transmitted to the tractor via the short-range wireless connection;
    (f) transmitting a tractor identifier from the tractor to the trailer via the short-range wireless connection; and
    (g) comparing the tractor identifier to schedule information to confirm connection with the correct tractor.

8. The method recited in claim 7, further comprising the steps of transmitting the unique identifier received via the physical data cable to a fleet management office and receiving a confirmation message at the tractor sent from the fleet management office confirming that the trailer is connected to a correct tractor.

9. The method recited in claim 8, wherein the unique identifier is wirelessly transmitted via a wireless carrier system.

10. The method recited in claim 7, further comprising the steps of determining that the unique trailer identifier communicated to the tractor via the physical data cable does not match the unique trailer identifier transmitted to the tractor via the short-range wireless connection and ending the short-range wireless connection in response.

11. The method recited in claim 7, further comprising the steps of determining that the unique trailer identifier communicated to the tractor via the physical data cable matches the unique trailer identifier transmitted to the tractor via the short-range wireless connection and sending a confirmation to a fleet management office in response.

12. The method recited in claim 7, further comprising the steps of determining that the physical data cable has been disconnected from the tractor and ending the short-range wireless connection in response.

13. A system for confirming pairing of a tractor and a trailer, comprising:

the trailer having a controller, capable of short-range wireless communication and wired communication with the tractor, wherein the controller is configured to: communicate a unique trailer identifier between the trailer and the tractor by sending a check signal to the tractor via a powerline carrier (PLC) wire physically connected to the tractor, wherein the check signal includes an anti-lock braking system (ABS) check signal and the unique trailer identifier; establish a short-range wireless connection between the trailer and the tractor by broadcasting a short-range wireless signal at the trailer, communication through which requires the unique trailer identifier sent via the PLC wire; transmit the unique trailer identifier from the trailer to the tractor via the short-range wireless connection; and determine whether the unique trailer identifier communicated to the tractor via the PLC wire matches the unique trailer identifier transmitted to the tractor via the short-range wireless connection.

14. The system recited in claim 13, wherein the controller transmits the unique identifier received via the PLC wire to a fleet management office and receives a confirmation message at the tractor sent from the fleet management office confirming that the trailer is connected to the correct tractor.

15. The system recited in claim 13, wherein the controller determines that the unique trailer identifier communicated to the tractor via the PLC wire does not match the unique trailer identifier transmitted to the tractor via the short-range wireless connection and ends the short-range wireless connection in response.

16. The system recited in claim 13, wherein the controller determines that the unique trailer identifier communicated to the tractor via the PLC wire matches the unique trailer identifier transmitted to the tractor via the short-range wireless connection and sends a confirmation to a fleet management office in response.

17. The system recited in claim 13, wherein the controller determines that the PLC wire has been disconnected from the tractor and ends the short-range wireless connection in response.

* * * * *